(12) United States Patent
Wang et al.

(10) Patent No.: US 12,054,575 B2
(45) Date of Patent: Aug. 6, 2024

(54) PREPARATION METHOD OF HIGHLY AROMATIC HYDROCARBON HYDROGENATED RESIN

(71) Applicant: Henghe Materials & Science Technology Co., Ltd., Zhejiang (CN)

(72) Inventors: Bin Wang, Zhejiang (CN); Xiangdong Sun, Zhejiang (CN)

(73) Assignee: Henghe Materials & Science Technology Co., Ltd., Zhejiang (CN)

( * ) Notice: Subject to any disclaimer, the term of this patent is extended or adjusted under 35 U.S.C. 154(b) by 538 days.

(21) Appl. No.: 17/425,332

(22) PCT Filed: Jun. 15, 2020

(86) PCT No.: PCT/CN2020/096116
§ 371 (c)(1),
(2) Date: Jul. 23, 2021

(87) PCT Pub. No.: WO2021/232520
PCT Pub. Date: Nov. 25, 2021

(65) Prior Publication Data
US 2022/0315675 A1    Oct. 6, 2022

(30) Foreign Application Priority Data

May 18, 2020   (CN) .......................... 202010419973.4

(51) Int. Cl.
*C08F 8/04*     (2006.01)
*B01J 23/44*    (2006.01)
(Continued)

(52) U.S. Cl.
CPC ................ *C08F 8/04* (2013.01); *B01J 23/44* (2013.01); *B01J 23/6525* (2013.01);
(Continued)

(58) Field of Classification Search
USPC .......................................... 526/290; 585/320
See application file for complete search history.

(56) References Cited

U.S. PATENT DOCUMENTS 4,933,409 A    6/1990   Evans et al.

FOREIGN PATENT DOCUMENTS

| | | |
|---|---|---|
| CN | 102382259 | 3/2012 |
| CN | 102718924 | 10/2012 |

(Continued)

OTHER PUBLICATIONS

Machine-generated English language translation of CN 102718924A, 7 pages, retrieved from ESPACENET on Feb. 23, 2024. (Year: 2012).*

(Continued)

*Primary Examiner* — Fred M Teskin
(74) *Attorney, Agent, or Firm* — JCIP GLOBAL INC.

(57) ABSTRACT

The present invention relates to a preparation method of a highly aromatic hydrocarbon hydrogenated resin, comprising the processes of fraction cutting, pretreatment, catalytic polymerization, two-stage hydrogenation, etc. The highly aromatic hydrocarbon hydrogenated resin obtained by the present invention has excellent compatibility with elastomers such as SBS, SIS and the like, and is suitable for hot melt adhesives, coatings, rubber modification, etc.

9 Claims, 1 Drawing Sheet

(51) Int. Cl.
*B01J 23/652* (2006.01)
*B01J 23/881* (2006.01)
*B01J 35/00* (2024.01)
*B01J 35/40* (2024.01)
*C08F 212/08* (2006.01)

(52) U.S. Cl.
CPC ............ *B01J 23/881* (2013.01); *B01J 35/40* (2024.01); *C08F 212/08* (2013.01)

(56) References Cited

FOREIGN PATENT DOCUMENTS

| CN | 102234538 | 7/2014 |
| CN | 109456794 | 3/2019 |
| CN | 109749778 | 5/2019 |
| CN | 110075911 | 8/2019 |

OTHER PUBLICATIONS

Machine-generated English language translation of CN 102382259A, 8 pages, retrieved from ESPACENET on Feb. 23, 2024. (Year: 2013).*

"International Search Report (Form PCT/ISA/210) of PCT/CN2020/096116", mailed on Jan. 20, 2021, pp. 1-4.

"Written Opinion of the International Searching Authority (Form PCT/ISA/237) of PCT/CN2020/096116", mailed on Jan. 20, 2021, pp. 1-9.

* cited by examiner

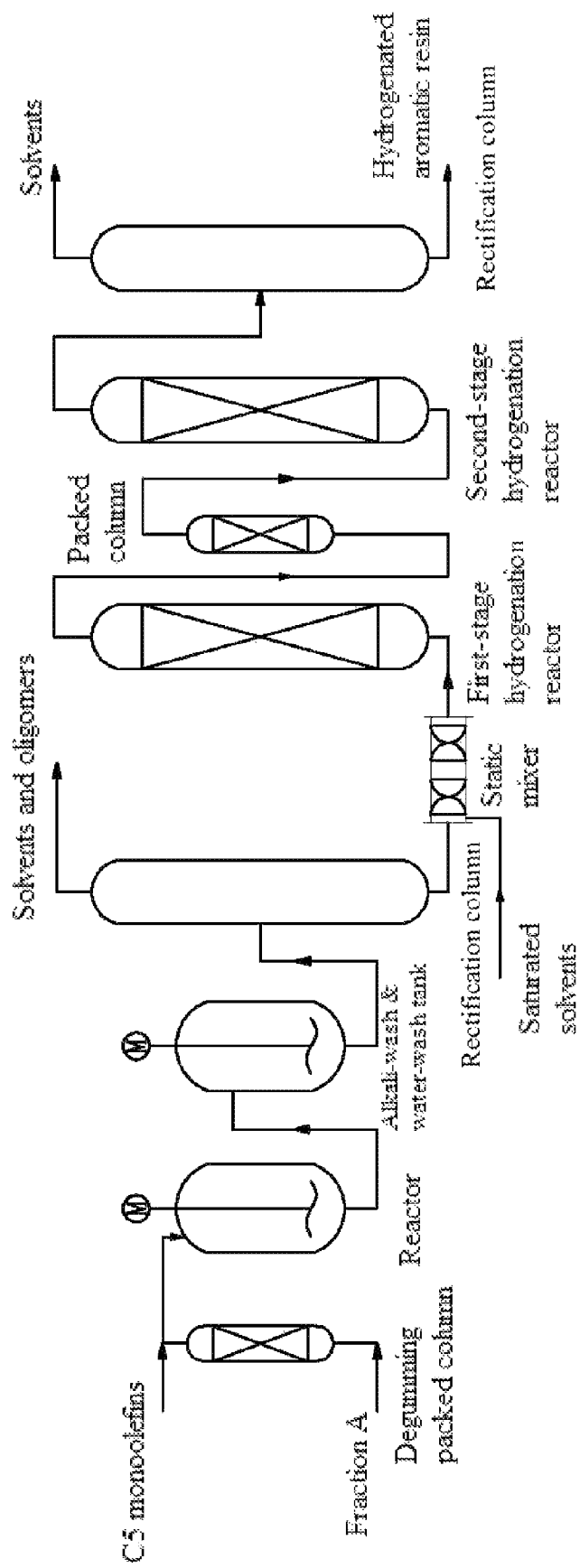

PREPARATION METHOD OF HIGHLY AROMATIC HYDROCARBON HYDROGENATED RESIN

CROSS-REFERENCE TO RELATED APPLICATION

This application is a 371 of international application of PCT application serial no. PCT/CN2020/096116, filed on Jun. 15, 2020, which claims the priority benefit of China application no. 202010419973.4, filed on May 18, 2020. The entirety of each of the above mentioned patent applications is hereby incorporated by reference herein and made a part of this specification.

BACKGROUND

Technical Field

The present invention belongs to the field of petroleum resins, and in particular relates to a preparation method of a highly aromatic hydrocarbon hydrogenated resin.

Description of Related Art

Ethylene cracking tar is a product of high-temperature condensation of raw materials and products during steam cracking of raw materials for ethylene cleavage, the conventional distillation range thereof is 380-500° C., and the fraction before 350° C. accounts for about 30-40%. The composition of ethylene cracking tar is extremely complex, including high content of indene, methylindene and their homologues, naphthalene, methylnaphthalene, ethylnaphthalene, dimethylnaphthalene, and anthracene, phenanthrene, and other components. Due to its complex components and difficulty in processing, it is mainly used as a raw material for the production of naphthalene and carbon black, and can also be used as a fuel for industrial boilers, with low economic value.

CN102234538B discloses a method for hydrotreating ethylene tar, comprising selecting a suitable cutting point to fractionate the full ethylene tar fraction, and selecting different hydroconversion methods according to the composition characteristics of the light fraction and the heavy fraction. The light fraction is hydrocracked to produce diesel blends, the heavy fraction can be hydrodecarbonized and hydroconverted to produce gasoline and diesel fractions. CN109456794A and CN109749778A disclose a combined method of suspended bed hydrogenation and countercurrent bed supplemental hydrogenation of heavy hydrocarbon material, which uses a high boiling point and highly aromatic hydrocarbon material BRF, through the hydrogenation modification reaction process BRA, to obtain a product BRA-P. CN110075911A discloses a catalyst for hydrodealkylation of C10+ heavy aromatics and a preparation method thereof. A mixture of transition metal oxides $MoO_3$, $Bi_2O_3$, $Co_3O_4$, etc. and NiO is used as a hydrogenation catalyst for hydrodealkylating C10+ heavy aromatics to prepare mixed xylene and improve its utilization rate.

In the above disclosures, the main way to improve the utilization rate of ethylene tar is to obtain more low-boiling liquid products through different hydrogenation processes. Due to the complexity of the components of ethylene tar, the above processes have defects in both the utilization rate of ethylene tar and the stability of the final product.

SUMMARY

The technical problem to be solved by the present invention is to provide a preparation method of highly aromatic hydrocarbon hydrogenated resin, which has strong adaptability to different ethylene tar raw materials with few by-products. The obtained highly aromatic hydrocarbon hydrogenated resin has excellent compatibility with elastomers such as SBS, SIS and the like, and is suitable for the fields of hot melt adhesives, coatings, rubber modification and the like.

The present invention provides a preparation method of highly aromatic hydrocarbon hydrogenated resin, comprising:

(1) an ethylene tar is rectifying cut to obtain fraction A with a distillation range of 180~260° C., which is degummed in a packed bed for use;

(2) fraction A and a C5 monoolefin is mixed at a mass ratio of 1:(0~0.2) to obtain ingredient B; first 40~60% of the total material mass of a solvent and 0.2~2.0% of a Friedel-Crafts catalyst are charged into a stirred reactor, then ingredient B is added dropwisely at −30~10° C. and the reaction is carried out for 0.5~3 h to obtain a polymerization solution;

(3) the polymerization solution in step (2) is alkali-washed, and then washed with water to neutral, the catalyst is removed; then, vacuum distillation is carried out to 200~250° C. under a vacuum of −0.08~−0.09 MPa to remove the solvent and oligomers to obtain a resin liquid;

(4) the resin liquid in step (3) is diluted with a hydrogenated mineral oil at a mass ratio of 1:(2~10), and then sent to a first-stage hydrogenation reactor, and react with $H_2$ at a pressure of 10~18 MPa and a temperature of 280~350° C. in the presence of Fe—Mo/$\gamma$-$Al_2O_3$ hydrogenation catalyst to obtain a hydrogenated resin liquid A;

(5) the hydrogenated resin liquid A obtained in step (4) is sent to an activated alumina packed column to remove impurities at 120~180° C.; then to a second-stage hydrogenation reactor to react with $H_2$ at a pressure of 12~15 MPa and a temperature of 240~300° C. in the presence of a metal modified Pd/$\gamma$-$Al_2O_3$ catalyst to obtain a hydrogenated resin liquid B;

(6) the hydrogenated resin liquid B obtained in step (5) is sent to a rectification column, and the rectification is carried out at a vacuum degree of −0.080~−0.095 MPa and a temperature of 200~260° C., the solvent is recovered at the top of the column, and the bottom material is granulated to obtain the highly aromatic hydrogenated resin.

The composition of fraction A in the step (1) is: 0.5~4.0 wt % methylstyrene, 0.5~2.0 wt % dihydrodicyclopentadiene, 2.0~5.0 wt % indene, 10.0~25.0 wt % methylindene, 3.0~8.0 wt % dimethylindene, 20.0~35.0 wt % naphthalene, 10.0~15.0 wt % methylnaphthalene, 3.0~8.0 wt % dimethylnaphthalene, the rest are inert components (such as methylpropylbenzene, dimethylethylbenzene, methyldiethylbenzene).

Fraction A in the step (1) has a gum content≤30 ppm.

The composition of the C5 monoolefin in the step (2) is: 2.0~5.0 wt % 1-pentene, 10.0~20.0 wt % 2-pentene, 8.0~15.0 wt % 2-methyl-1-butene, 20.0~30.0 wt % 2-methyl-2-butene, 0~5.0 wt % cyclopentene, the rest are inert components (such as n-pentane, isopentane, cyclopentane).

The composition of ingredient B in the step (2) is: 0~0.83 wt % 1-pentene, 0~3.33 wt % 2-pentene, 0~2.5 wt % 2-methyl-1-butene, 0~5.0 wt % 2-methyl-2-butene, 0~0.83 wt % cyclopentene, 0.42~4.0 wt % methylstyrene, 0.42~2.0 wt % dihydrodicyclopentadiene, 1.67~5.0 wt % indene, 8.33~25.0 wt % methylindene, 2.5~8.0 wt % dimethylindene, 16.67~35.0 wt % naphthalene, 8.33~15.0 wt % methylnaphthalene, 2.5~8.0 wt % dimethylnaphthalene, the rest are inert components.

The solvent in the step (2) is one or more of toluene, xylene, and trimethy-benzene.

The Friedel-Crafts catalyst in the step (2) is preferably $BF_3$ and its complexes, such as boron trifluoride ether, boron trifluoride methyl ethyl ketone and the like.

The catalyst in the step (3) is removed by using a 10~15% alkali solution.

The hydrogenated mineral oil in the step (4) is a low-viscosity saturated mineral oil with a distillation range of 250–400° C. and a bromine number≤1.0 g/100 g.

The Fe—Mo/γ-$Al_2O_3$ hydrogenation catalyst in the step (4) has a Fe/Mo molar ratio of (1.5~2.2):1, and the content of γ-$Al_2O_3$ is 55~70 wt %.

The liquid hourly space velocity LSHV in the first-stage hydrogenation reactor in the step (4) is 0.5~1.0 $h^{-1}$.

The activated alumina in the step (5) is obtained by modifying with 0.05~1.5 wt % iron sulfate or aluminum sulfate, and the average diameter thereof is 13~25 mm.

The metal-modified Pd in the metal-modified Pd/γ-$Al_2O_3$ catalyst in step (5) is Mo-modified Pd, wherein the content of Pd is 0.8~1.1 wt %, the Mo/Pd molar ratio is (0.02~0.2):1, the rest is γ-$Al_2O_3$; the metal-modified Pd/γ-$Al_2O_3$ catalyst has a specific surface area of 130~180 $m^2$/g, a pore volume of 0.4~0.6 $cm^3$/g, and a particle size of 2~10 mm.

The liquid hourly space velocity LSHV in the second-stage hydrogenation reactor in the step (5) is 0.33~2.0 $h^{-1}$.

The highly aromatic hydrogenated resin obtained in the step (6) has a softening point of 90~120° C., a Gardner color number of ≤4.0 #, and an aromaticity of 5~20%.

Beneficial Effects (1) The present invention uses ethylene tar as a raw material to prepare light-colored resins with higher added value, and the process is highly adaptable to different ethylene tar raw materials, produces few by-products, improves its economic value and reduces its impact on the environment.

(2) The highly aromatic hydrocarbon hydrogenated resin prepared by the present invention has the advantages of highly aromatic hydrocarbon, light color, moderate softening point, narrow molecular weight distribution, etc., and has excellent compatibility with elastomers such as SBS, SIS and the like.

(3) The first-stage Fe—Mo/γ-$Al_2O_3$ hydrogenation catalyst used in the present invention has characteristics of better gum resistance, sulfur resistance, impurity resistance, etc., and is suitable for hydrogenation processes of complex components.

(4) The second-stage metal-modified Pd/γ-$Al_2O_3$ catalyst used in the present invention has high activity, low degradation rate and long service life, and is suitable for the highly hydrogenation process of resin. The present invention uses two-stage hydrogenation process, the first stage adopts poison-resistant hydrogenation catalyst to pre-hydrogenate the resin and remove toxic impurities, the second stage uses a high-activity hydrogenation catalyst to further saturate the unsaturated bonds in the resin molecules to improve the hydrogenation effect and resin performance.

(5) The iron sulfate or aluminum sulfate modified activated alumina used in the present invention has better adsorption selectivity and accommodation to halogen in an organic macromolecule solution, and effectively protects the subsequent hydrogenation catalyst.

BRIEF DESCRIPTION OF THE DRAWINGS

The FIGURE is a schematic diagram of the process flow of the present invention.

DESCRIPTION OF THE EMBODIMENTS

The present invention will be further explained below in conjunction with specific examples. It should be understood that these examples are only used to illustrate the present invention and not to limit the scope of the present invention. In addition, it should be understood that after reading the teachings of the present invention, the skilled in the art can make various changes or modifications to the present invention, and these equivalent forms also fall within the scope defined by the appended claims of the present application.

Due to the extremely complex composition of ethylene tar, Table 1 is only its approximate composition.

TABLE 1

| Components | Content, wt % |
| --- | --- |
| Naphthalene | 4.0~18.0 |
| Indene and derivatives thereof | 0.5~10.0 |
| Methylnaphthalene | 2.0~10.0 |
| Dimethylnaphthalene | 2.0~10.0 |
| Biphenyl | 0.5~2.0 |
| Benzopyrene | 0.1~2.0 |
| Aromatic compounds | 20.0~60.0 |
| Asphaltene | 10.0~40.0 |

The typical composition of cut fraction A of the ethylene tar used in the examples is shown in Table 2.

TABLE 2

Typical composition of fraction A (distillation range: 180~260° C.)

| No. | Compound name | Content, % |
| --- | --- | --- |
| 1 | Methylstyrene | 1.5 |
| 2 | Dihydrodicyclopentadiene | 0.9 |
| 3 | Dimethylethylbenzene | 2.5 |
| 4 | Indene (1H-indene) | 3.8 |
| 5 | Methylindene | 14.4 |
| 6 | Dimethylindene | 6.5 |
| 7 | Naphthalene | 28.7 |
| 8 | Methylnaphthalene | 12.5 |
| 9 | Dimethylnaphthalene | 6.0 |
| 10 | Biphenyl | 5.4 |
| 11 | Remaining components | 17.8 |

The hydrogenated mineral oil used in the examples is a low-viscosity saturated mineral oil with a distillation range of 250-400° C. and a bromine value≤1.0 g/100 g.

The Fe—Mo/γ-$Al_2O_3$ hydrogenation catalyst used in the examples has a Fe/Mo molar ratio of 2:1, and a γ-$Al_2O_3$ content of 62.5 wt %.

The activated alumina was obtained by modifying with 1.5 wt % iron sulfate or aluminum sulfate, and has an average diameter of 13-17 mm.

The metal modified Pd in the metal-modified Pd/γ-$Al_2O_3$ catalyst used in the examples is Mo modified Pd; the γ-$Al_2O_3$ content is 98.7 wt %; the Mo modified Pd/γ-$Al_2O_3$ catalyst has a specific surface area of 160 $m^2$/g, a pore volume of 0.5 $cm^3$/g, a particle size of 4~6 mm.

Example 1

(1) an ethylene tar was rectifying cut to obtain fraction A with a distillation range of 180~260° C., which was passed through an alumina packed bed to reduce its gum to 20 ppm.
(2) fraction A mentioned above and a C5 monoolefin was mixed at a mass ratio of 1:0.15 to obtain ingredient B, wherein the composition of ingredient B is: 0.26% 1-pentene, 1.13% 2-pentene, 1.87% 2-methyl-1-butene, 2.65% 2-methyl-2-butene, 0.59% cyclopentene, 0.60% methylstyrene, 1.04% dihydrodicyclopentadiene, 4.27% indene, 15.43% methylindene, 6.68% dimethylindene, 26.51% naphthalene, 9.06% methylnaphthalene, 4.55% dimethylnaphthalene, the rest are inert components; first 40% of the total material mass of xylene and 0.7% of boron trifluoride ether catalyst were charged into a stirred reactor, then ingredient B was added dropwisely at −5° C. and the reaction was carried out for 2 h to obtain a polymerization solution.
(3) the polymerization solution in step (2) was alkali-washed, and then washed with water to neutral, the catalyst is removed (with a 10% alkali solution); then, vacuum distillation was carried out under a vacuum of −0.09 MPa and a temperature of 240° C. to remove the solvent and oligomers to obtain a resin liquid.
(4) the resin liquid in step (3) was diluted with a hydrogenated mineral oil at a mass ratio of 1:3, and then sent to a first-stage hydrogenation reactor, and reacted with $H_2$ at a pressure of 11.5 MPa and a temperature of 320° C. in the presence of Fe—Mo/γ-$Al_2O_3$ hydrogenation catalyst to obtain a hydrogenated resin liquid A, wherein the liquid hourly space velocity LSHV was 0.5 $h^{-1}$.
(5) the hydrogenated resin liquid A obtained in step (4) was sent to an activated alumina packed column to remove impurities such as halogen and gums at 150° C.; then to a second-stage hydrogenation reactor to react with $H_2$ at a pressure of 12 MPa and a temperature of 270° C. in the presence of a metal modified Pd/γ-$Al_2O_3$ catalyst to obtain a hydrogenated resin liquid B, wherein the liquid hourly space velocity LSHV was 0.67 $h^{-1}$;
(6) the hydrogenated resin liquid B obtained in step (5) was sent to an rectification column, and the rectification was carried out at a vacuum degree of −0.085 MPa and a temperature of 240° C., the solvent was recovered at the top of the column, and the bottom material was granulated to obtain a highly aromatic hydrogenated resin having a softening point of 101.5° C., a Gardner color number of 1.4, and an aromaticity of 10.3%.

Examples 2~6

The ratio of the cut fraction A of the ethylene tar to the C5 monoolefins in the polymerization feedstock is a key factor in the process of the present invention. Table 3 below shows the effect of the main polymerizable monomers in ingredients B after the two were mixed on the resin products; the remaining conditions are the same as those in Example 1.

TABLE 3

| Composition | Example 2 | Example 3 | Example 4 | Example 5 | Example 6 |
| --- | --- | --- | --- | --- | --- |
| Total C5 monoolefins, % | 0 | 2.48 | 5.66 | 8.87 | 11.53 |
| Indene and derivatives, % | 28.65 | 25.47 | 24.50 | 19.96 | 16.41 |
| Naphthalene and derivatives, % | 49.20 | 44.15 | 41.23 | 38.56 | 35.77 |
| Properties of highly aromatic hydrocarbon hydrogenated resins | | | | | |
| Gardner color number, # | 2.8 | 1.6 | 1.4 | 1.1 | 0.8 |
| Softening point, ° C. | 117.1 | 106.0 | 102.5 | 100.2 | 94.5 |
| Aromaticity, % | 16.2 | 13.7 | 12.4 | 9.3 | 8.6 |
| Mw/Mn | 1.40 | 1.48 | 1.53 | 1.55 | 1.68 |

It can be seen from the above Examples 2~6 that, as the total content of the C5 monoolefins in ingredient B increases, the softening point, the Gardner color number and the aromaticity of the hydrogenated resin all decrease, and the molecular weight distribution Mw/Mn tends to increase. When there is no C5 monoolefin as a modifier, the hydrogenated resin has the maximum aromaticity. The hydrogenated resin has a suitable aromaticity and molecular weight distribution, which can effectively enhance the compatibility with the elastomers such as SBS, SIS, and the like, and improve the cohesive strength of blends therefrom.

Examples 7~10

Table 4 below is based on steps (1) to (3) of Example 1, wherein the process conditions of the first-stage Fe—Mo/γ-$Al_2O_3$ catalytic hydrogenation were adjusted, and their effects on hydrogenated resins were studied. The remaining conditions were the same as those in Example 1.

TABLE 4

| Process conditions for hydrogenation | Example 7 | Example 8 | Example 9 | Example 10 |
| --- | --- | --- | --- | --- |
| Temperature, ° C. | 280 | 320 | 320 | 350 |
| Pressure, MPa | 12 | 12 | 18 | 12 |
| LSHV, $h^{-1}$ | 0.5 | 0.5 | 0.5 | 1.0 |
| Properties of highly aromatic hydrocarbon hydrogenated resins | | | | |
| Gardner color number, # | 2.2 | 1.4 | 1.3 | 0.9 |
| Softening point, ° C. | 105.5 | 102.0 | 102.3 | 93.8 |
| Aromaticity, % | 12.0 | 10.4 | 9.8 | 7.2 |
| Mw/Mn | 1.57 | 1.50 | 1.51 | 1.46 |

It can be seen from the above Examples 7~10 that, in the first-stage hydrogenation process, the hydrogenation temperature has a more obvious effect on the performance of the hydrogenated resin. The first-stage hydrogenation process can increase the hydrogenation degree of hydrogenated resins, improve the thermal cracking tendency of the resin, which lowers the softening point and molecular weight distribution, and the aromaticity.

Examples 11~13

The second-stage hydrogenation catalyst is a trace Mo modified Pd catalyst, and modified catalysts having a Pd content of 1.00% were compared in Examples 11~13, and the remaining conditions are the same as those in Example 1.

TABLE 5

|  | Example 11 | Example 12 | Example 13 |
|---|---|---|---|
| Mo:Pd | 0.03 | 0.09 | 0.15 |
| Properties of highly aromatic hydrocarbon hydrogenated resins | | | |
| Gardner color number, # | 1.4 | 1.5 | 1.4 |
| Softening point, ° C. | 102.3 | 100.5 | 100.8 |
| Aromaticity, % | 10.5 | 8.8 | 7.5 |
| Mw/Mn | 1.55 | 1.51 | 1.47 |

It can be seen from the above Table that, the change of the Mo content in the second-stage hydrogenation catalyst has a critical influence on the aromaticity and the molecular weight distribution of the hydrogenated resin. Mo in the second-stage hydrogenation catalyst can be used as its Lewis acid adsorption center, which is conducive to the adsorption of petroleum resin molecules on the carrier, thereby improving its activity and enhancing its hydrogenation selectivity to aromatic groups. The presence of Mo reduces the loss of Pd of the Pd catalyst during the reaction, improves the stability of the catalyst and prolongs the service life of the Pd catalyst.

Comparative Example 1

The resin liquid obtained in steps (1)~(3) in Example 1 was diluted with a hydrogenated mineral oil at a mass ratio of 1:3 and then sent to a hydrogenation reactor. In the presence of Pd/$\gamma$-Al$_2$O$_3$ catalyst, it reacted with H$_2$ at a pressure of 14.0 MPa and a temperature of 280° C. to obtain a hydrogenated resin liquid, wherein the liquid hourly space velocity LSHV is 0.5 h$^{-1}$; then it was transported to a rectification column, and vacuum rectified at a vacuum of −0.085 MPa and a temperature of 240° C. The solvent was recovered at the top of the tower. After the bottom material was pelletized, a hydrogenated resin with a softening point of 105.5° C., a Gardner color number of 2.2 and an aromaticity of 16.7% was obtained.

The above-mentioned Pd/$\gamma$-Al$_2$O$_3$ catalyst is a general-purpose palladium-based catalyst with a Pd content of 0.95~1.05% and the rest being $\gamma$-Al$_2$O$_3$. Due to lack of first-stage hydrogenation catalyst protection, the service life of the palladium-based catalyst is relatively short, usually less then 200 h.

Comparative Example 2

The resin liquid obtained in steps (1)~(3) in Example 1 was diluted with a hydrogenated mineral oil at a mass ratio of 1:3 and then sent to a hydrogenation reactor. In the presence of Raney nickel catalyst, it reacted with H$_2$ at a pressure of 11.0 MPa and a temperature of 270° C. to obtain a hydrogenated resin liquid, wherein the liquid hourly space velocity LSHV is 0.5 h$^{-1}$; then it was transported to a rectification column, and vacuum rectified at a vacuum of −0.085 MPa and a temperature of 240° C. The solvent was recovered at the top of the tower. After the bottom material was pelletized, a hydrogenated resin with a softening point of 86.0° C., a Gardner color number of 1.5 and an aromaticity of 3.8% was obtained.

The above-mentioned Raney nickel catalyst has a Ni—Al structure, with a Ni content of 41% and an Al content of 59%. In the presence of the catalyst, the molecular bonds of petroleum resin were broken and degraded, the softening point was greatly reduced, and the aromatic groups were saturated in a large amount. Similarly, due to the influence of impurities such as halogen and sulfur, the service life of the Raney nickel catalyst is less than 200 h.

What is claimed is:

1. A preparation method of a highly aromatic hydrocarbon hydrogenated resin, comprising:

step 1, an ethylene tar is rectifying cut to obtain fraction A with a distillation range of 180~260° C., which is degummed in a packed bed for use;

step 2, the fraction A and a C5 monoolefin is mixed at a mass ratio of 1:(0~0.2) to obtain ingredient B; first 40~60% of the total material mass of a solvent and 0.2~2.0% of a Friedel-Crafts catalyst are charged into a stirred reactor, then ingredient B is added dropwisely at −30~10° C. and the reaction is carried out for 0.5~3 h to obtain a polymerization solution;

step 3, the polymerization solution in the step 2 is alkali-washed, and then washed with water to neutral, the catalyst is removed; then, vacuum distillation is carried out to 200~250° C. under a vacuum of −0.08~−0.09 MPa to remove the solvent and oligomers to obtain a resin liquid;

step 4, the resin liquid in the step 3 is diluted with a hydrogenated mineral oil at a mass ratio of 1:(2~10), and then sent to a first-stage hydrogenation reactor, and react with H$_2$ at a pressure of 10~18 MPa and a temperature of 280~350° C. in the presence of Fe—Mo/$\gamma$-Al$_2$O$_3$ hydrogenation catalyst to obtain a hydrogenated resin liquid A;

step 5, the hydrogenated resin liquid A obtained in the step 4 is sent to an activated alumina packed column to remove impurities at 120~180° C.; then to a second-stage hydrogenation reactor to react with H$_2$ at a pressure of 12~15 MPa and a temperature of 240~300° C. in the presence of a metal modified Pd/$\gamma$-Al$_2$O$_3$ catalyst to obtain a hydrogenated resin liquid B; and step 6, the hydrogenated resin liquid B obtained in the step 5 is sent to a rectification column, and the rectification is carried out at a vacuum degree of −0.080~−0.095 MPa and a temperature of 200~260° C., the hydrogenated mineral oil is recovered at the top of the column, and the bottom material is granulated to obtain the highly aromatic hydrogenated resin.

2. The preparation method according to claim 1, wherein the composition of the fraction A in the step 1 is: 0.5~4.0 wt % methylstyrene, 0.5~2.0 wt % dihydrodicyclopentadiene, 2.0~5.0 wt % indene, 10.0~25.0 wt % methylindene, 3.0~8.0 wt % dimethylindene, 20.0~35.0 wt % naphthalene, 10.0~15.0 wt % methylnaphthalene, 3.0~8.0 wt % dimethylnaphthalene, the rest are inert components.

3. The preparation method according to claim 1, wherein the composition of the C5 monoolefin in the step 2 is: 2.0~5.0 wt % 1-pentene, 10.0~20.0 wt % 2-pentene, 8.0~15.0 wt % 2-methyl-1-butene, 20.0~30.0 wt % 2-methyl-2-butene, 0~5.0 wt % cyclopentene, the rest are inert components.

4. The preparation method according to claim 1, wherein the composition of ingredient B in the step 2 is: 0~0.83 wt % 1-pentene, 0~3.33 wt % 2-pentene, 0~2.5 wt % 2-methyl- 1-butene, 0~5.0 wt % 2-methyl-2-butene, 0~0.83 wt % cyclopentene, 0.42~4.0 wt % methylstyrene, 0.42~2.0 wt % dihydrodicyclopentadiene, 1.67~5.0 wt % indene, 8.33~25.0 wt % methylindene, 2.5~8.0 wt % dimethylindene, 16.67~35.0 wt % naphthalene, 8.33~15.0 wt % methylnaphthalene, 2.5~8.0 wt % dimethylnaphthalene, the rest are inert components.

5. The preparation method according to claim 1, wherein the solvent in the step 2 is one or more of toluene, xylene, and trimethylbenzene.

6. The preparation method according to claim 1, wherein the Fe—Mo/$\gamma$-Al$_2$O$_3$ hydrogenation catalyst in the step 4 has a Fe/Mo molar ratio of (1.5~2.2):1, and the content of $\gamma$-Al$_2$O$_3$ is 55~70 wt %.

7. The preparation method according to claim 1, wherein the activated alumina in the step 5 is obtained by modifying with 0.05~1.5 wt % iron sulfate or aluminum sulfate, and the average diameter thereof is 13~25 mm.

8. The preparation method according to claim 1, wherein the metal-modified Pd in the metal-modified Pd/$\gamma$-Al$_2$O$_3$ catalyst in the step 5 is Mo-modified Pd, wherein the content of Pd is 0.8~1.1 wt %, the Mo/Pd molar ratio is (0.02~0.2):1, the rest is $\gamma$-Al$_2$O$_3$; the metal-modified Pd/$\gamma$-Al$_2$O$_3$ catalyst has a specific surface area of 130~180 m$^2$/g, a pore volume of 0.4~0.6 cm$^3$/g, and a particle size of 2~10 mm.

9. The preparation method according to claim 1, wherein the highly aromatic hydrogenated resin obtained in the step 6 has a softening point of 90~120° C., a Gardner color number of ≤4.0 #, and an aromaticity of 5~20%.

* * * * *